United States Patent
Sahu et al.

(10) Patent No.: US 11,494,415 B2
(45) Date of Patent: Nov. 8, 2022

(54) METHOD AND SYSTEM FOR JOINT SELECTION OF A FEATURE SUBSET-CLASSIFIER PAIR FOR A CLASSIFICATION TASK

(71) Applicant: Tata Consultancy Services Limited, Mumbai (IN)

(72) Inventors: Ishan Sahu, Kolkata (IN); Ayan Mukherjee, Kolkata (IN); Arijit Ukil, Kolkata (IN); Soma Bandyopadhyay, Kolkata (IN); Chetanya Puri, Kolkata (IN); Rituraj Singh, Kolkata (IN); Arpan Pal, Kolkata (IN); Rohan Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 839 days.

(21) Appl. No.: 16/421,372

(22) Filed: May 23, 2019

(65) Prior Publication Data
US 2019/0361919 A1 Nov. 28, 2019

(30) Foreign Application Priority Data
May 23, 2018 (IN) .............................. 201821019386

(51) Int. Cl.
*G06V 10/771* (2022.01)
*G06F 16/28* (2019.01)
(Continued)

(52) U.S. Cl.
CPC .......... *G06F 16/285* (2019.01); *G06F 16/245* (2019.01); *G06K 9/623* (2013.01); *G06V 30/1912* (2022.01); *G06V 10/771* (2022.01)

(58) Field of Classification Search
CPC ..... G06F 16/285; G06F 16/245; G06K 9/623; G06K 9/6231; G06V 30/1912; G06V 10/771
See application file for complete search history.

(56) References Cited

U.S. PATENT DOCUMENTS

2011/0078099 A1\* 3/2011 Weston ................ G06K 9/6231
706/12

OTHER PUBLICATIONS

A. Barla et al: "Machine learning methods for predictive proteomics", Briefings in Bioinformatics, vol. 9, No. 2, Sep. 28, 2007 (Sep. 28, 2007), pp. 119-128, (Year: 2007).\*

(Continued)

*Primary Examiner* — Hesham K Abouzahra
(74) *Attorney, Agent, or Firm* — Finnegan, Henderson, Farabow, Garrett & Dunner LLP (57) ABSTRACT

A method and system for a feature subset-classifier pair for a classification task. The classification task corresponds to automatically classifying data associated with a subject(s) or object(s) of interest into an appropriate class based on a feature subset selected among a plurality of features extracted from the data and a classifier selected from a set of classifier types. The method proposed includes simultaneously determining the feature subset-classifier pair based on a relax-greedy {feature subset, classifier} approach utilizing sub-greedy search process based on a patience function, wherein the feature subset-classifier pair provides an optimal combination for more accurate classification. The automatic joint selection is time efficient solution, effectively speeding up the classification task.

6 Claims, 6 Drawing Sheets

(51) Int. Cl.
    *G06F 16/245*     (2019.01)
    *G06K 9/62*     (2022.01)
    *G06V 30/19*     (2022.01)

(56) References Cited

OTHER PUBLICATIONS

Ruiz, R. et al. (2005). "Heuristic Search over a Ranking for Feature Selection," *Computational Intelligence and Bioinspired Systems*; pp. 742-749.

Krishnapuram, B. et al. (2004). "Joint Classifier and Feature Optimization for Comprehensive Cancer Diagnosis Using Gene Expression Data," *Journal of Computational Biology*, vol. 11, No. 2-3; pp. 224-242.

Guo, Guodong et al. "Simultaneous Feature Selection and Classifier Training via Linear Programming: A Case Study for Face Expression Recognition," *Proceedings 2003 IEEE Computer Society Conference on Computer Vision and Pattern Recognition*.

Wieland, M. et al. (2014). "Performance Evaluation of Machine Learning Algorithms for Urban Pattern Recognition from Multispectral Satellite Images," *Remote Sens.*, vol. 6, No. 4; pp. 2912-2939.

Najdi, S. et al. (Aug. 2017). "Feature ranking and rank aggregation for automatic sleep stage classification: a comparative study," *BioMedical Engineering OnLine*, vol. 16, supp. 1; pp. 1-19.

\* cited by examiner

METHOD AND SYSTEM FOR JOINT SELECTION OF A FEATURE SUBSET-CLASSIFIER PAIR FOR A CLASSIFICATION TASK

CROSS-REFERENCE TO RELATED APPLICATIONS AND PRIORITY

This application takes priority from the Indian filed application no. 201821019386 filed on 23 May 2018 the entirety of which is hereby incorporated by reference.

TECHNICAL FIELD

The disclosure herein generally relates to feature selection and classification and, more particularly to joint selection of a feature subset-classifier pair for a classification task.

BACKGROUND

Automatic classification techniques enable analysing the acquired data and tagging it an appropriate class. In most of the practical applications, the data corresponds to a plurality of signals being monitored. Analyzing the signals and classifying them into the appropriate class using machine based classification requires extracting plurality of features from the signals, selecting the most relevant features and using a machine based classifier to classify the signals into appropriate class using the relevant features. For feature-based classification techniques, it is critical to identify which features make good predictors of class membership for the classes that are to be distinguished.

For example, in medical field, features or physiological markers acquired from sensor signals for disease identification or classification are hand-crafted. The processes used to arrive at useful features are very disease and signal specific and may not optimally apply for a wider range of problems. So, for each disease identification problem considerable time and effort is required separately. Conventionally, existing methods providing feature selection and appropriate classifier follow a two stage approach. In most of the existing methods that provide solution for feature selection and classifier selection mention joint optimization of feature subset selection and classifier selection. However, the joint optimization, here in the existing methods, indicates that feature selection is followed by classifier selection or vice versa and dependent on assumption of selection of one classifier for n features subset selection.

Thus, existing two stage approach may first select a feature set and then a suitable classifier or vice versa. This approach is time consuming and may not provide an optimal feature set classifier pair. Thus, a feature subset selection and identification of appropriate classification method (classifier) to optimize the predictive performance of a supervised machine learning system is required. Currently, existing methods make isolated attempts to optimize the feature selection and classifier identification. However, feature set has an intrinsic relationship with classifier technique thus such isolated approaches may not provide optimal pair. Classically, a classifier method is apriori selected, feature-subset is discovered by filter or wrapper method. Such approaches would in effect make the response space unexplored, where response space indicates the dual response of the feature set and classifier set over some performance objective function on the instance space.

SUMMARY

Embodiments of the present disclosure present technological improvements as solutions to one or more of the above-mentioned technical problems recognized by the inventors in conventional systems. For example, in one embodiment, a method for selection of a feature subset-classifier pair for a classification task is described. The method comprises extracting a plurality of features from a plurality signals, wherein the plurality of signals comprise signals from multiple signal domain representations. Further, the method comprises deriving a set of features from the extracted plurality of features based on a plurality of statistical measures corresponding to the extracted plurality of features. Furthermore, the method comprises creating a plurality of ranked lists by ranking the derived set of features, wherein each ranked list among the plurality of ranked lists is created based on a unique ranking objective selected from a plurality of ranking objectives that provides unbiased estimation of importance of each feature. The plurality of ranked lists with corresponding derived set of features in each ranked list is represented as a feature matrix ($\mathcal{T}r^{ranked}$). Furthermore, the method comprises simultaneously determining the feature subset-classifier pair ($\mathcal{H}^*$, $\mathcal{T}r^*$), comprising a feature subset ($\mathcal{T}r^*$) selected from a ranked list among the plurality of ranked lists and a classifier ($\mathcal{H}^*$) among a plurality of classifiers types ($\mathcal{H}$), utilizing a metaheuristic incremental search based joint optimization technique applied on the plurality of ranked list and a plurality of classifiers types ($\mathcal{H}$). The determined feature subset-classifier pair ($\mathcal{H}^*$, $\mathcal{T}r^*$) provides highest performance over a performance objective ($\rho$) for the classification task.

In another aspect, system for joint selection of a feature subset-classifier pair for a classification task is described. The system comprises a processor, an input/output interface, a memory, wherein the memory comprises a joint selection module. The joint selection module is configured to extract a plurality of features from a plurality signals, wherein the plurality of signals comprise signals from multiple signal domain representations. Further, the joint selection module is configured to derive a set of features from the extracted plurality of features based on a plurality of statistical measures corresponding to the extracted plurality of features. Further, the joint selection module is configured to create a plurality of ranked lists by ranking the derived set of features, wherein each ranked list among the plurality of ranked lists is created based on a unique ranking objective selected from a plurality of ranking objectives that provides unbiased estimation of importance of each feature. The derived set of features in each ranked list is represented as a feature matrix ($\mathcal{T}r^{ranked}$). Furthermore, the joint selection module is configured simultaneously determining the feature subset-classifier pair ($\mathcal{H}^*$, $\mathcal{T}r^*$), comprising a feature subset ($\mathcal{T}r^*$) selected from a ranked list among the plurality of ranked lists and a classifier ($\mathcal{H}^*$) among a plurality of classifiers types ($\mathcal{H}$), utilizing a metaheuristic incremental search based joint optimization technique applied on the plurality of ranked list and a plurality of classifiers types ($\mathcal{H}$). The determined feature subset-classifier pair ($\mathcal{H}^*$, $\mathcal{T}r^*$) provides highest performance over a performance objective ($\rho$) for the classification task.

In yet another aspect, a non-transitory computer readable medium is provided. The non-transitory computer-readable medium stores instructions which, when executed by a hardware processor, cause the hardware processor to perform actions comprising extracting a plurality of features from a plurality signals, wherein the plurality of signals comprise signals from multiple signal domain representations. Further, the actions comprise deriving a set of features from the extracted plurality of features based on a plurality of statistical measures corresponding to the extracted plurality of features. Furthermore, the actions comprise creating a plurality of ranked lists by ranking the derived set of features, wherein each ranked list among the plurality of ranked lists is created based on a unique ranking objective selected from a plurality of ranking objectives that provides unbiased estimation of importance of each feature. The derived set of features in each ranked list is represented as a feature matrix ($\mathcal{Fr}^{ranked}$). Furthermore, the actions comprise simultaneously determining the feature subset-classifier pair ($\mathcal{H}$ *, $\mathcal{Fr}$ *), comprising a feature subset ($\mathcal{Fr}$ *) selected from a ranked list among the plurality of ranked lists and a classifier ($\mathcal{H}$ *) among a plurality of classifiers types ($\mathcal{H}$), utilizing a metaheuristic incremental search based joint optimization technique applied on the plurality of ranked list and a plurality of classifiers types ($\mathcal{H}$). The determined feature subset-classifier pair ($\mathcal{H}$ *, $\mathcal{Fr}$ *) provides highest performance over a performance objective (ρ) for the classification task. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for joint selection of a feature subset-classifier pair for a classification task. The classification task corresponds to automatically classifying data associated with a subject(s) or object(s) of interest into an appropriate class based on a feature subset selected among a plurality of features, alternatively referred as feature super set, extracted from the data, and a classifier selected from a set of classifier types (classifiers). The joint selection, interchangeably referred as simultaneous selection, provides automated simultaneous selection of the feature subset-classifier pair. The selected feature subset-classifier pair provides an optimal combination for more accurate classification. The automatic joint selection is time efficient solution, effectively speeding up the classification task. Further, instead of separately discovering the feature subset and the classifier, which often leads to suboptimal result, the joint selection leads to optimal result. The disclosed simultaneous selection approach is completely automated without requiring supervised approach or manual intervention. The method disclosed provides a generic framework for domain independent classification task with robust predictive performance for classification tasks.

The method provides an automodel framework, alternatively referred as automodel, and a relax greedy approach to jointly discover or select a combination (pair) of the feature subset and the classifier (interchangeably referred classifier method), which satisfy an optimization criteria on response space by given performance objective function. The method provides an automated process of finding the best combination of the feature subset and the classifier. Contrary to well-established approach of feature relevance score computation, the method computes an integrated relevant score of feature and classifier sets (jointly finding relevance score of feature space and classifier) and exploits the power of ensembling the optimization process. Once the automodel is generated, the relax-greedy approach for identifying or searching the feature subset-classifier pairs provides a wrapper function, which minimizes structural risk and eliminates over-fitting issue, effectively ensuring substantially lesser generalization error. The relax-greedy selection approach avoids the nesting effect of state-of-the-art wrapper function. The integrated relevant score of the feature set and the classifier sets and exploits the power of ensembling the optimization process. Thus, learner independent filter-based feature ranking and searching over ranked feature set is integrated herein.

In an embodiment, a reuse framework is provided, where a pool of generic features (independent of data types or problem) constitutes a part of the feature set.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
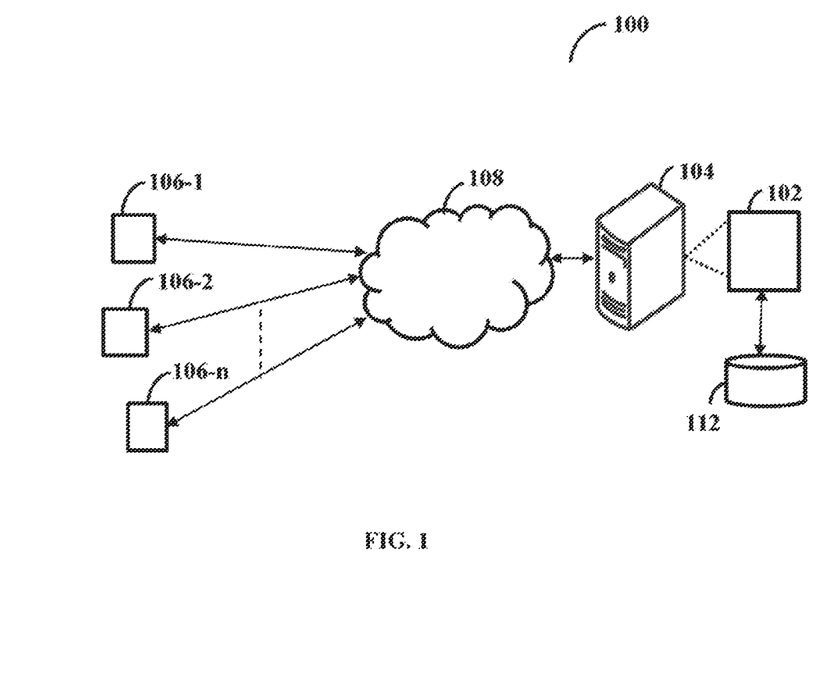
FIG. 1 illustrates an example environment implementing a system for joint selection of a feature subset-classifier pair for a classification task, according to some embodiments of the present disclosure.

FIG. 1 illustrates an example environment 100 implementing a system 102 that enables joint selection of the feature subset-classifier pair for the classification task, according to some embodiments of the present disclosure. The environment 100 depicts one or more data sources 106-1 through 106-n that are source of data for the system 102. In an embodiment, one or more data sources among the data sources 106-1 through 106-n collect data, which may be sensor data associated with a plurality signals monitored or acquired from sensors attached to the subject(s) or the object(s) of interest.

The data or the plurality of signals acquired through the data sources 106-1 through 106-n can be stored in the repository 112. In an embodiment, the data sources 106-1 through 106-n may be directly connected to the system 102 implemented in a computing device 104. The system 102 may be internal (not shown) to a computing device 104 or may be externally coupled (as shown in FIG. 1) to the computing device 104. In an alternate embodiment, the data repository 112 may be internal to the system 102 (as depicted in FIG. 2).

In an embodiment, a network 108, transmitting data streams from the data sources 106-1 through 106-n to the computing device 104, may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links. In an embodiment, the computing device 104, which implements the system 102 can be a workstation, a mainframe computer, a general purpose server, a network server or the like. Further, the repository 112, coupled to the system 102 may also store other data such as the intermediate data generated during joint selection of the feature subset-classifier pair by the system 102.

The components or modules and functionalities of system 102 for joint selection of the feature subset-classifier pair for the classification task are described further in detail in conjunction with FIG. 2.

FIG. 2 illustrates a functional block diagram of the system 102 of FIG. 1, according to some embodiments of the present disclosure.

The system 102 includes or is otherwise in communication with one or more hardware processors such as a processor(s) 202, at least one memory such as a memory 204, and an I/O interface 206. The processor 202 (hardware processor), the memory 204, and the I/O interface(s) 206 may be coupled by a system bus such as a system bus 208 or a similar mechanism. The memory 204 further may include modules 210.

In an embodiment, the modules 210 include a joint selection module 212 and other modules (not shown) for implementing functions of the system 102. In an embodiment, the modules 210 can be an Integrated Circuit (IC), external to the memory 204 (not shown), implemented using a Field-Programmable Gate Array (FPGA) or an Application-Specific Integrated Circuit (ASIC). The names of the modules of functional block within the modules 210 referred herein, are used for explanation and are not a limitation. Further, the memory 204 can also include the repository 112.

The data, which may be sensor data associated with a plurality signals monitored or acquired from sensors attached to the subject(s) or the object(s) of interest. The sensor data is then processed to extract a plurality of features from the plurality of signals.

To perform joint selection or simultaneous selection of the feature subset-classifier pair for a classification task of interest, in an embodiment, the joint selection module 212 is configured to generate the automodel that identifies the feature subset-classifier pair, represented mathematically as ($\mathcal{H}$ *, $\mathcal{Tr}$ *). The automodel is explained in detail in conjunction with joint selection module 212 of FIG. 2B. To generate the automodel, the joint selection module 212 can be configured to extract the plurality of features from the plurality of signals acquired from the data sources 106-1 through 106-n. The plurality of signals include signals from multiple signal domain representations.

Further, the joint selection module 212 can be configured to derive a set of features (feature set) from the extracted plurality of features (feature superset) based on a plurality of statistical measures from temporal, spectral and wavelet domains corresponding to the extracted plurality of features. One or more statistical measures that may be used include mean, variance, skewness, kurtosis and the like.

Further, the joint selection module 212 can be configured to create a plurality of ranked lists by ranking the derived set of features. Each ranked list among the plurality of ranked lists is created based on a unique ranking objective selected from a plurality of ranking objectives. The derived set of features is represented as a feature matrix, mathematically represented as ($\mathcal{Tr}^{ranked}$), while ranking the derived set of features. Instead of ranking based on single criteria such as maximizing mutual information among the features, which is used by existing ranking mechanisms, the joint selection module 212 proposed separately ranks features based on multiple ranking objectives that provides unbiased estimation of importance of each feature.

Upon creation of the plurality of ranked list, the joint selection module 212 can be configured to simultaneously determine the feature subset-classifier pair ($\mathcal{H}$ *, $\mathcal{Tr}$ *) utilizing a metaheuristic incremental search based joint optimization technique applied on the plurality of ranked list and a plurality of classifiers types, represented mathematically as $\mathcal{H} = \{\mathcal{H}_1, \mathcal{H}_2, \ldots \mathcal{H}_\beta\}$ providing a pool of classifiers (classifier methods). The joint optimization technique jointly determines a feature subset from a ranked list among the plurality of ranked list and a classifier among the plurality of classifiers types, ensures best or highest performance over a given performance objective such as maximizing sensitivity, maximizing F1-score and the like. To implement the proposed metaheuristic incremental search based joint optimization technique, the joint selection module 212 is configured to identify a plurality of feature subsets for each classifier from the plurality of classifiers types. Each feature subset of the plurality of feature subsets is selected from every ranked list from the plurality of ranked lists by adding a derived feature from the ranked list one at a time. Further, the joint selection module 212 is configured to pair each classifier with the feature subset selected from the plurality of feature subsets to generate a plurality of feature subset-classifier pairs. The selected feature subset ($\mathcal{Tr}$ *) for pairing provides highest performance, wherein the performance is determined based on a set of performance parameters and a performance score computed using k-fold performance metric. Further, for all the plurality of feature subset-classifier pairs, the joint selection module 212 is configured to evaluate the plurality of feature subset-classifier pairs for the classification task. Based upon the evaluation, the joint selection module 212 is configured to determine the feature subset-classifier pair ($\mathcal{H}$ *, $\mathcal{Tr}$ *) from the evaluated plurality of feature subset-classifier pairs, such that the determined the feature subset-classifier pair ($\mathcal{H}$ *, $\mathcal{Tr}$ *) provides minimum structural risk and generalization error for the classification task by satisfying the performance objective for the classification task. The performance objective, for example, may be maximizing f1-score, maximizing accuracy and the like.

The proposed metaheuristic search using relax-greedy {feature subset, classifier} selection approach from feature superset (derived features) and gamut of classifiers (plurality of classifier types or classifier methods) is a sub-greedy search mechanism based on a patience function $\gamma(\delta)$, wherein the search process waits for relaxation window number of ranked features. Features that maximize the performance within the relaxation window are considered. The relax-greedy selection approach avoids the nesting effect of state-of-the-art wrapper function. An initial low performing feature is not discarded entirely, and that feature is selected if that feature in combination of other features demonstrate incremental performance gain within the patience window $\delta_{max}$. This joint selection module 212 is configured to compute integrated relevant score of a feature subset and classifier sets and exploits the power of ensembling the optimization process. It integrates both of learner independent filter-based feature ranking and searching over ranked feature set. Traditionally, a feature that does not improve the performance, is eliminated. However, that feature in combination of other feature(s) in the later stage may provide better result. The patience function disclosed ensures that a feature even performs worse is not discarded until few more combination (based on the patience value) is considered and checked. For example, let F1 though Fn be derived set of features from the plurality of features extracted from the plurality of signals. Then, if feature F2 performs worse than feature F1; feature F2 is not eliminated. Say, patience window $\delta_{max}=2$. So, if {F1, F2, F3} performs worse than F1, then {F1, F2, F3, F4} is checked; if {F1, F2, F3, F4} performs better than F1, {F1, F2, F3, F4} is chosen; if not F2 is discarded, now the feature subset combination is {F1, F2, F3}. FIG. 2B illustrates functional flow of the joint selection module 212 of the system 102 described in FIG. 2A, according to some embodiments of the present disclosure.

The problem statement considered to be solved, for example, can be as provided here. For example herein, consider following vector spaces such as a space of instances X, a space of labels $\mathcal{L}$, a space of transformation or feature generation functions $\mathcal{Tr}$ and a space of the classifiers $\mathcal{H}$. Training examples or training data considered herein is $\mathcal{D}=((x_1, 1_1), (x_2, 1_2), \ldots (x_n, 1_n)) \in (X \times \mathcal{L})^n$. For simplicity, $\mathcal{L}=\{\pm 1\}$. Let, $\Psi$ be the total number of transformation functions or features in $\mathcal{Tr}=\{\mathcal{Tr}_1, \mathcal{Tr}_2, \ldots \mathcal{Tr}_\Psi\}$. The feature generation is a transformation over training examples $\mathcal{D}$ to produce feature superset $\mathcal{U}=\mathcal{Tr}(\mathcal{D})$. Let, $\mathcal{H}=\{\mathcal{H}_1, \mathcal{H}_2, \ldots \mathcal{H}_h\}$ be the pool of hypothesis or the classifiers available (such as supervised classifiers), for example, support vector machine, ensemble leaners like Adaboost, random forest and similar others. Let, $\mathbb{T}s$ be the testing data=$((x_1, 1_1), (x_2, 1_2), \ldots (x_j, 1_j)) \in (X \times \mathcal{L})^j$. Let, the training examples $\mathcal{D}$ be split into $\mathcal{D}_{train}, \mathcal{D}_{validation}$. Let, $\rho$ be the performance objective function. For example, $\rho$ may be F1-score, sensitivity and similar others. Here, $\rho$ forms the response space of $\{\mathcal{H}, \mathcal{Tr}\}$, trained on $\mathcal{D}_{train}$ and tested on $\mathcal{D}_{validation}$. Let, $\hat{\mathcal{L}}$ be the prediction by model $m \in (\mathcal{H} \times \mathcal{Tr})$ over the validation dataset or test dataset $\mathcal{D}_{validation}$, where $m$ is trained by $\mathcal{D}_{train}$. Let, $\Pi$ be the heuristic search methods over $m=\{\mathcal{H}_i, \mathcal{Tr}_j\}$, $\forall i, \forall j$ and $\Pi=\{\pi_1, \pi_2, \ldots, \pi_p\}$: there are p search methods, and $\Pi$ contains heterogeneous integration function $\mathcal{J}$ that attempts to minimize overfitting or generalization error in {classifier, feature subset} selection. Let, $m \in \mathcal{m}$, $m^*=\{\mathcal{H}^*, \mathcal{Tr}^*\}$ be the optimal set of classifier and feature subset, such that:

$$m^* = \{\mathcal{H}^*, \mathcal{Tr}^*\} = \arg\max_{\{\Pi, \mathcal{H}, \mathcal{Tr}\}} \rho\left(\Pi(\mathcal{J})\left(\mathcal{D}_{train}(\{\mathcal{H}, \mathcal{Tr}\}) \xrightarrow{\mathcal{D}_{validation}} \hat{\mathcal{L}}\right)\right) \quad (1a)$$

As depicted in FIG. 2B, the joint selection module 212 creates the plurality of ranked lists by ranking the derived set of features. Initial feature ranking is performed on the complete feature set $\mathcal{Tr}$ by $\mathcal{R}=\{\mathcal{R}_1, \mathcal{R}_2, \ldots, \mathcal{R}_\wedge\}$ number of filter-based feature ranking methods. The derived feature set, interchangeably referred as feature set, is first ranked by a plurality of filter based ranking methods that ensures class separability. Subsequently, a heterogeneous integration function $\mathcal{J}$ executes joint optimization of feature subset-classifier pair selection on the ranked feature set over performance objective $\rho$ to find an optimal learned model $m^*=\{\mathcal{H}^*, \mathcal{Tr}^*\}$.

The feature ranking function is explained herein. Let $\wedge$ be the set of different filter feature ranking methods based on gamut of objective criteria. Examples of such methods include minimum Redundancy Maximum Relevance (mRMR), Conditional Infomax Feature Extraction (CIFE), distance correlation, Maximal Information Coefficient (MIC) and the like. Each of $\lambda \in \wedge$ can analyze the qualities of features from the training data. For example, in the context of mutual information $\mathbb{I}(x; y)$, one of the qualities is to rank $r_i$, $i=1, 2, \ldots, \Psi$ according to relevancy of a feature $\mathcal{Tr}_i$ with minimum redundancy. The ranking is context-dependent, which may be Fisher Score, Spearman Correlation, Kendall Correlation, Pearson Correlation, Mutual Information. Accordingly, $\wedge$ number of feature ranked list $\mathcal{R}=\{\mathcal{R}_1, \mathcal{R}_2, \ldots, \mathcal{R}_\wedge\}$ are obtained, where each $\mathcal{R}_{j\in\wedge}$ the contains rank of each of the $\Psi$ number of features and $R_-(j\in\wedge)$ is sorted descending order list. $\mathcal{Tr}_{i,j}^{ranked}$, $i=[1, 2, \ldots, \Psi]$, $j=[1, 2, \ldots, \wedge]$ vector of ranked feature ranks is obtained, which denotes the rank of $i$^th feature in $\mathcal{Tr}$ for $j^{th}$ filter method in R.

Once the ranking functionality is performed, the joint selection module 212 is configured to perform feature wrapping with classifier. For feature wrapping procedure, $\Pi$ number of search methods of finding that combination of $m^*=\{\mathcal{H}^* \in \mathcal{H}, \mathcal{Tr}^* \subset \mathcal{Tr}\}$ are considered. Let each of $\pi \in \Pi$ find $m_\pi^*$ as in equation 1 below:

$$m_\pi^* = \underset{\mathcal{H}, \mathcal{Tr}}{\mathrm{argmax}}\left(\mathrm{median}\left(\sum_{p=1}^k \rho\left[\{\mathcal{H}_{\mathcal{D}\mathcal{D}_p}^{p,h}, \mathcal{Tr}_{i,j}^{ranked}\}\right]\right)\right), \forall h, \forall i, \forall j \quad (1b)$$

The automodel disclosed generates $m^*=\{\mathcal{H}^* \in \mathcal{H}, \mathcal{Tr}^* \cup \mathcal{Tr}\}$ as an ensemble of the classifiers, ensemble ranking methods, ensemble searching methods and searching over ranked feature set: $\mathcal{Tr} \rightarrow \mathcal{Tr}^{ranked} \supset \mathcal{Tr}^*$.

In the automodel, $\Pi$ is a pool of heuristic search mechanisms on ranked feature set represented as the feature matrix $\mathcal{Tr}^{ranked}$, which are computationally wrapper methods like greedy forward selection, greedy backward elimination and the disclosed relax-greedy wrapper function.

In greedy feature selection wrapper function:

A feature $\mathcal{T}r_j^{ranked} \in \mathcal{T}r^{ranked}$ is selected with previously selected feature set $\mathcal{T}r_{(-j)}^{ranked} \subset \mathcal{T}r^{ranked}$, initially as in equation 2 below:

$$\rho_{CV-median}\left(\left(\mathcal{D}_{train}(\{\mathcal{H}_i, \mathcal{T}r_{\{-j\}=\emptyset\}}^{ranked}\})\xrightarrow{\mathcal{D}_{validation}}\hat{\mathcal{L}}\right)\right)=0 \quad (2)$$

by hypothesis or classifier $\mathcal{H}_i$ as in equation 3 below:

$$\rho_{CV-median}\left(\left(\mathcal{D}_{train}(\{\mathcal{H}_i, \mathcal{T}r_{j\cup\{-j\}}^{ranked}\})\xrightarrow{\mathcal{D}_{validation}}\hat{\mathcal{L}}\right)\right) > \quad (3)$$
$$\rho_{CV-median}\left(\left(\mathcal{D}_{train}(\{\mathcal{H}_i, \mathcal{T}r_{\{-j\}}^{ranked}\})\xrightarrow{\mathcal{D}_{validation}}\hat{\mathcal{L}}\right)\right)$$

Where, $\rho_{CV-median}$ is a cross-validated performance function.

Conversely in backward elimination, a feature is removed when its cross-validated median performance score $\rho_{CV-median}$ is less than previously selected feature set, where initial feature set consists of all the feature vectors in ranked order. The disclosed relax-greedy approach is used as one of the wrapper methods of feature selection. This is the sub-greedy search algorithm with some patience. Search process waits for $\delta_{max} \in \mathbb{Z}^+$ number of ranked features. The waiting in the searching method starts when absolute greedy condition is not satisfied and it is continued until a positive feedback (which is equal to the incremental rise of performance criteria $\rho_{CV-median}$ is received or a stopping criteria (patience $\delta$ is exhausted, $\delta$=0) reached. The relax-greedy wrapper approach avoids the nesting effect of state-of-the-art wrapper function. An initial low performing feature would not be discarded entirely, and that feature would be selected if that feature in combination of other features demonstrate incremental performance gain within the patience window $\delta\_max$.

An example approach and logic for implementing the relax-greedy wrapper algorithm with patience function is provided below:

```
1: Input: Feature set: 𝒯r = {𝒯r₁, 𝒯r₂, ... 𝒯r_Ψ}, 𝒯r =
   {𝒯r_generic, 𝒯r_handcrafted}, Filter-based rank methods: ℛ_{j∈Λ}, pool of
   classifiers ℋ = {ℋ₁, ℋ₂, ... ℋ_ℏ}.
2: Output: Optimal feature set 𝒯r* for each of the given ℋ_k, k ∈ ℏ.
3: Let, 𝒯r_i^{ℛ_j} be the i^th rank feature by the j^th filter-based ranking method,
   𝒯r_current be the feature in current iteration, ρ_current be the evaluated
   performance of 𝒯r_current by given ℋ_k classifier, and 𝒯r_prev denote
   the selected set of features in previous checkpoint and ρ_prev be the
   evaluated performance of 𝒯r_prev by given ℋ_k classifier.
4: Patience function Y(δ), where δ is the patience score, δ_max =
   ⌈α√Ψ⌉, 0 < α ≤ 1, Ψ is the total number of features.
5: Initiate: 𝒯r_current = 𝒯r_prev = 𝒯r* = ∅, ρ_current = ρ_prev = ρ* (best
   value of performance figure) = 0, δ = δ_max.
6: FOR i = 1: Ψ
7:    𝒯r_current ← 𝒯r_prev ∪ 𝒯r_i^{ℛ_j}
8:    ρ_current ← ρ_CV-median((𝒟_train({ℋ_k, 𝒯r_current})—→^{𝒟_validation} ℒ̂))
9:    IF ρ_current ≤ ρ*, THEN
10:       δ ← δ - 1
11:       IF ρ_current ≤ ρ_prev, THEN
12:          𝒯r_prev ← 𝒯r_current
13:          ρ_prev ← ρ_current
14:       ELSE
15:          𝒯r_prev ← 𝒯r*
16:          ρ_prev ← ρ*
17:       IF δ < δ_max, THEN
18:          i ← i - 1
19:       END
20:    END
21:    ELSEIF ρ_current > ρ* THEN
22:       δ ← δ_max
23:       IF ρ_prev ← ρ* THEN
24:          𝒯r_prev ← 𝒯r*
25:          ρ_prev ← ρ*
26:          IF δ < δ_max, THEN
27:             i ← i - 1
28:          END
29:       ELSE
30:          𝒯r_prev ← 𝒯r_current
31:          ρ_prev ← ρ_current
32:       END
33:       𝒯r* ← 𝒯r_current
34:       ρ* ← ρ_current
35:    END
36:    IF δ == 0, THEN
37:       stop the search and return 𝒯r*
38:    END
39:    i ← i + 1
40: END
```

Example of execution of relax-greedy wrapper algorithm is provided herein. Let, Ψ=15: total number of feature set in $\mathcal{T}r$, $\delta_{max} = \lceil \alpha\sqrt{\Psi} \rceil = 3$, $\alpha=0.6$. Let, $\mathcal{R}_j$ be the filter-based feature ranking method (mRMR [5]), classifier $\mathcal{H}_k$ (Support Vector Machine). Ranked feature list $\mathcal{T}r$-ranked by $\mathcal{R}_j = \mathcal{T}r^{\mathcal{R}_j} = [\mathcal{T}r_2, \mathcal{T}r_{15}, \mathcal{T}r_6, \mathcal{T}r_8, \mathcal{T}r_{13}, \mathcal{T}r_7, \mathcal{T}r_1, \mathcal{T}r_4, \mathcal{T}r_{10}, \mathcal{T}r_5, \mathcal{T}r_{11}, \mathcal{T}r_9, \mathcal{T}r_{14}, \mathcal{T}r_{12}, \mathcal{T}r_3]$ Also, $\delta=\delta_{max}$. First the $\rho_{CV-median}$ performance ($\rho$ be F1-score) is computed for $\mathcal{T}r_2$ by $\mathcal{H}_k$. Let, $\rho_{CV-median}(\mathcal{T}r_2, \mathcal{H}_k)=0.72$. $\mathcal{T}r_{prev}=\{\mathcal{T}r_2\}$ Next, $\mathcal{T}r_{current}=\mathcal{T}r_{prev}\cup\{\mathcal{T}r_{15}\}$ $\rho_{CV-median}(\mathcal{T}r_{current}, \mathcal{H}_k)=0.74$, $\mathcal{T}r_{prev}=\{\mathcal{T}r_2, \mathcal{T}r_{15}\}$; next $\mathcal{T}r_{current}=\mathcal{T}r_{prev}\cup\{\mathcal{T}r_6\}$, $\rho_{CV-median}(\mathcal{T}r_{current}, \mathcal{H}_k)=0.70$, $\mathcal{T}r_{prev}=\{\mathcal{T}r_2, \mathcal{T}r_{15}, \mathcal{T}r_6\}$, and $\delta=3-1=2$, as $\rho_{CV-median}$ of current is less than the best encountered so far, next $\mathcal{T}r_{current}=\mathcal{T}r_{prev}\cup\{\mathcal{T}r_8\}$ $\rho_{CV-median}(\mathcal{T}r_{current}, \mathcal{H}_k)=0.71$, $\delta=1$, as $\rho_{CV-median}$ of current is less than the best. But as this is better than previous we check the combination of $\mathcal{T}r_8$ with the best subset encountered so far, $\mathcal{T}r_{prev}=\mathcal{T}r*=\{\mathcal{T}r_2, \mathcal{T}r_{15}\}$. For next iteration, $\mathcal{T}r_{current}=\mathcal{T}r*\cup\mathcal{T}r_8=\{\mathcal{T}r_2, \mathcal{T}r_{15}, \mathcal{T}r_8\}$, $\rho_{CV-median}(\mathcal{T}r_{current}, \mathcal{H}_k)=0.75$, $\delta=\delta_{max}$, as $\rho_{CV-median}$ of current is better than $\rho*=0.74$, $\mathcal{T}r_{prev}=\{\mathcal{T}r_2, \mathcal{T}r_{15}, \mathcal{T}r_8\}$. Next iteration $\mathcal{T}r_{current}=\mathcal{T}r_{prev}\cup\{\mathcal{T}r_{13}\}$. $\rho_{CV-median}(\mathcal{T}r_{current}, \mathcal{H}_k)=0.66$, $\delta=2$, $\mathcal{T}r_{prev}=\{\mathcal{T}r_2, \mathcal{T}r_{15}, \mathcal{T}r_8, \mathcal{T}r_{13}\}$, next $\mathcal{T}r_{current}=\mathcal{T}r_{prev}\cup\{\mathcal{T}r_7\}$, $\rho_{CV-median}(\mathcal{T}r_{current}, \mathcal{H}_k)=0.69$, $\delta=1$, which is better than previous but less than the best so far. We check the combination of $\mathcal{T}r_7$ with the best subset encountered so far, $\mathcal{T}r_{prev}=\mathcal{T}r*=\{\mathcal{T}r_2, \mathcal{T}r_{15}, \mathcal{T}r_8\}$. Next iteration $\mathcal{T}r_{current}=\mathcal{T}r_{prev}\cup\{\mathcal{T}r_7\}$, $\rho_{CV-median}(\mathcal{T}r_{current}, \mathcal{H}_k)=0.74$, $\delta=0$. When, $\delta==0$, the algorithm returns the best feature subset it has seen during the search. The main philosophy is that the proposed relax-greedy wrapper function patiently waits although adding a feature may initially decrease the performance until patience score exhausted or some future combination increases the previous best performance. Thus, nesting effect is eliminated.

Further explained below is an example ensemble selection approach for the automodel. Firstly, complete feature set is ranked by different filter-based ranking methods. Subsequently, heterogeneous integration function $\mathcal{J}$ does the ensemble search over the response space of different hypotheses or classifiers and wrapper methods including relax-greedy method on the ranked lists to find the best combination of $m^* = \{\mathcal{H}^*, \mathcal{T}r^*\}$ ({classifier, feature subset}) under the performance objective $\rho$.

Ensemble feature ranking:

---

1: Input: Training dataset $\mathcal{D}$, $\Lambda$ number of filter feature ranking methods, $\Psi$ number of transformation functions or features $\mathcal{T}r = \{\mathcal{T}r_1, \mathcal{T}r_2, \ldots \mathcal{T}r_\Psi\}$, $\mathcal{T}r = \{\mathcal{T}r_{generic}, \mathcal{T}r_{handcrafted}\}$.
2: Compute ranked feature list over pool of filter methods: $\mathcal{T}r_{i,j}^{ranked}$, $i = [1, 2, \ldots, \Psi], j = [1, 2, \ldots, \Lambda]$, on the training dataset $\mathcal{D}$; $\Psi$ is complete feature dimension.
3: Output $\mathcal{T}r^{ranked}$: $\mathcal{T}r^{ranked} = \{\mathcal{T}r_{i,j}^{ranked}\}$ ranked feature matrix for each of the methods in $\Lambda$ and for each of the feature vectors in $\Psi$.
  Heterogeneous integration function $\mathcal{J}$:
4: Input: $\mathcal{T}r^{ranked}$, $\mathcal{H}$ number of hypotheses or classifiers.
5: for $\pi = 1$ to $\Pi$
6: $\Pi$: set of wrapper search methods includes relax-greedy method
7: for $\hbar = 1$: $\mathcal{H}$
8: $\rho_\pi \hbar = \rho_{CV-median} (\mathcal{D}_{train} (\mathcal{H}_\hbar, \mathcal{T}r_{i,j}^{ranked})), \forall i \in \Psi \; \forall j \in \Lambda$.
  $\rho_{CV-median}$: cross-validated median performance function
  Example of $\rho$ would be F1-score, accurancy, sensitivity.
9: end
10: end 11: Select $\{\hbar^*, (i, j)^*\} = \underset{\hbar, \pi, i, j}{\mathrm{argmax}} (\rho_\pi^\hbar)$ 12: Output: $m^* = \{\mathcal{H}^*, \mathcal{T}r^*\}$
  where $\mathcal{H}^* = \mathcal{H}[\hbar^*] \in \mathcal{H}$
  $\mathcal{T}r^* = \mathcal{T}r_{i,j}^{ranked}[(i, j)^*] \subset \mathcal{T}r$

---

Thus, automodel of the joint selection module 212 enables searching over ranked feature set $\mathcal{T}r^{ranked}$ using the disclosed relax-greedy wrapper function. The filter-based methods generate ranked feature which has monotonicity of class separability criteria. If the class separability criteria be $\mathcal{C}_i$ for $\mathcal{R}_i$, $\forall i$, $i \in \mathcal{R} = \{\mathcal{R}_1, \mathcal{R}_2, \ldots, \mathcal{R}_\Lambda\}$ by front-end filter-based ranking method, $\mathcal{R} = \{\mathcal{R}_1, \mathcal{R}_2, \ldots, \mathcal{R}_\Lambda\}$ ($\mathcal{R}$ forms the front-end of Automodel) given by equation 4 below:

$$\mathcal{C}_i(\mathcal{T}r_{i,1}^{ranked}, \mathcal{T}r_{i,2}^{ranked} \ldots, \mathcal{T}r_{i,k}^{ranked}) >$$
$$\mathcal{C}_i(\mathcal{T}r_{i,1}^{ranked}, \mathcal{T}r_{i,2}^{ranked} \ldots,$$
$$\mathcal{T}r_{i,k+1}^{ranked}) \quad (4)$$

Such monotonicity in class separability along with the structural risk minimization attempt by heterogeneous integration function $\mathcal{J}$ (where relax-greedy algorithm is one of the wrapper functions) and relax-greedy wrapper function can converge to an optimal model of feature subset and classifier.

Computational complexity of the relax-greedy approach is described here. Let, $\Psi$ be the total number of features, $\hbar$ be the total number of classifiers. Relax-greedy is one-pass searching method. So, computational complexity is $\mathcal{O}(\Psi)$. For searching over $\hbar$ number of classifiers, $\mathcal{H} = \{\mathcal{H}_1, \mathcal{H}_2, \ldots \mathcal{H}_\Lambda\}$, the complete time complexity is $$\left(\max_{\mathcal{H}} \mathcal{O}(func(\mathcal{H}_{i=1,2,\ldots,\hbar}))\right) \times \mathcal{O}(\Psi).$$

Thus, computational complexity of classifier method depends on the number of training instances $|\mathcal{D}_{train}|$ and often $\mathcal{O}(func(\mathcal{H}_{i=1,2,\ldots,\hbar})) \sim \mathcal{O}(|\mathcal{D}_{train}|^2)$. On that basis, the computational complexity of relax-greedy algorithm is: $\mathcal{O}(|\mathcal{D}_{train}|^2) \times \mathcal{O}(\Psi) \to \mathcal{O}(|\mathcal{D}_{train}|^2 \times \Psi)$. For the likely scenario $|\mathcal{D}_{train}| >>$, the computational complexity is $\sim \mathcal{O}(|\mathcal{D}_{train}|^2)$, which is independent of number of features.

Figure 2A:
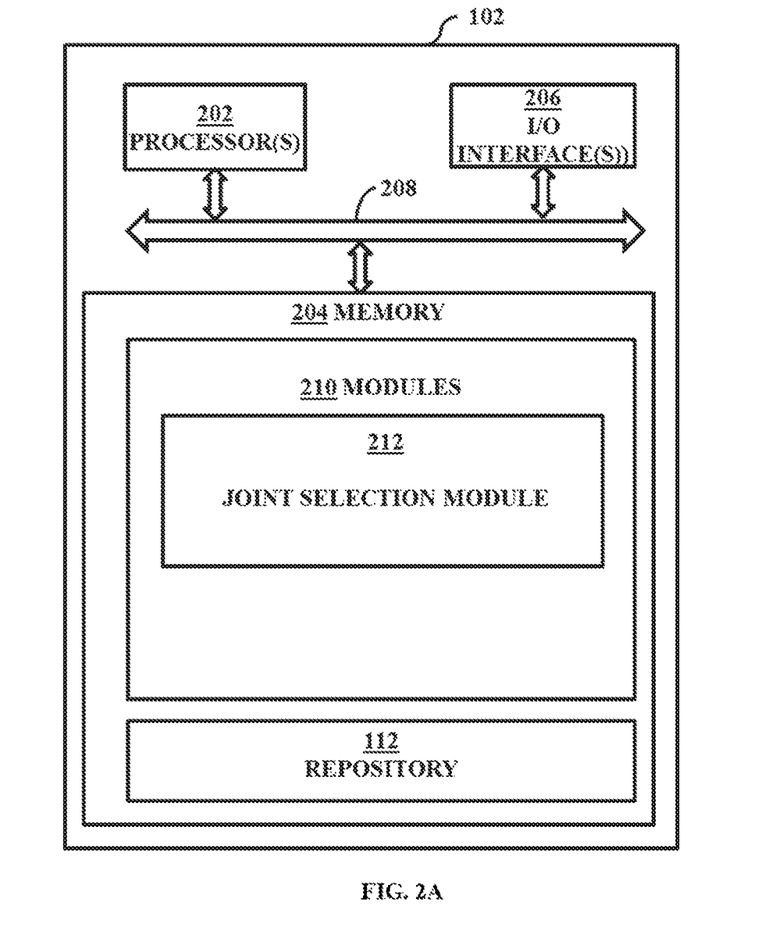
FIG. 2A illustrates a functional block diagram of the system of FIG. 1, according to some embodiments of the present disclosure.
Figure 2B:
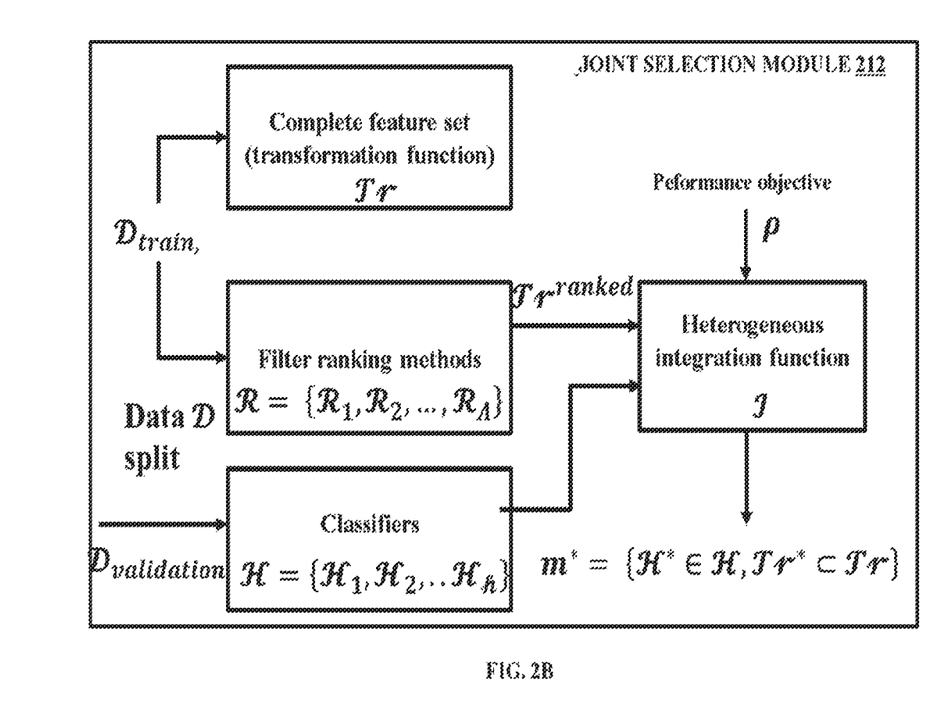
FIG. 2B illustrates a functional flow of a joint selection module of the system described in FIG. 2A, according to some embodiments of the present disclosure.

As depicted in FIG. 2A, the hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, internal or external to the memory 204, for triggering execution of functions to be implemented by the modules 210.

The I/O interface(s) 206 in the system 102 may include a variety of software and hardware interfaces, for example, a web interface, a graphical user interface and the like. The interface(s) 206 may include a variety of software and hardware interfaces, for example, interfaces for peripheral device(s), such as a keyboard, a mouse, an external memory, sensors (data sources 106-1 through 106-n), and a printer and a display. The interface(s) 206 may enable the system 102 to communicate with other devices, such as the computing device 104, web servers and external databases (such as the repository 112, if external to the system 102). The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting a number of computing systems with one another or to another server computer. The I/O interface(s) 206 may include one or more ports for connecting a number of devices to one another or to another server. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the system 102. The repository 112 may store data that is processed, received, or generated as a result of the execution of one or more modules in the module(s) 210.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 3:
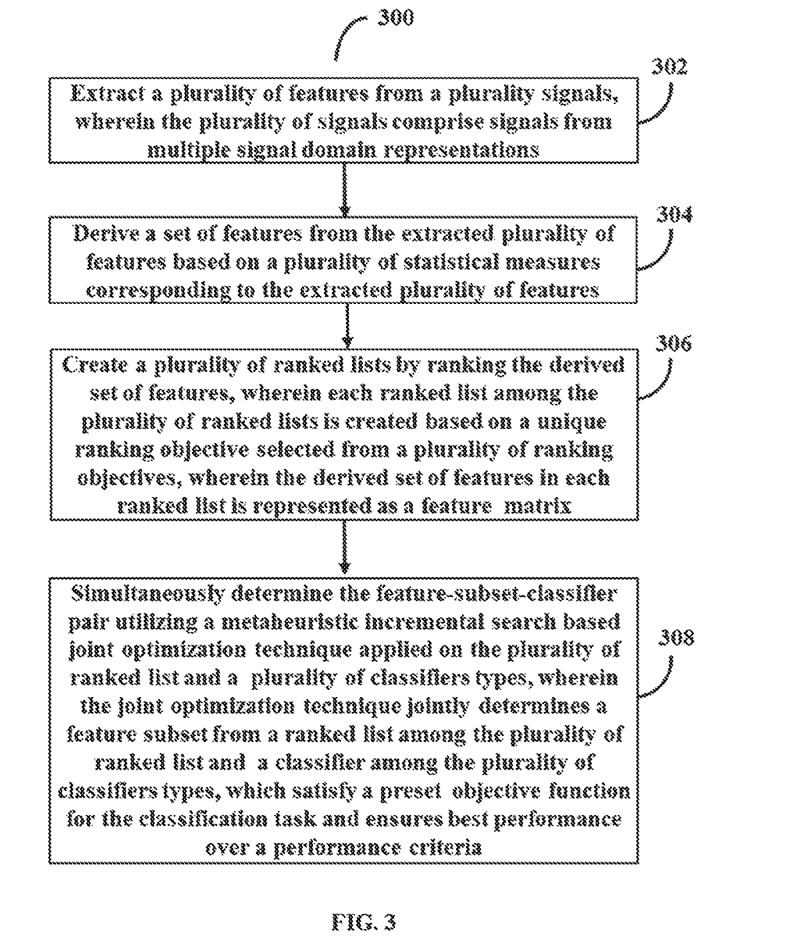
FIG. 3 is a flow diagram illustrating a method for joint selection of the feature subset-classifier pair for the classification task, in accordance with some embodiments of the present disclosure.

FIG. 3 is a flow diagram illustrating a method 300 for joint selection of the feature subset-classifier pair for the classification task, in accordance with some embodiments of the present disclosure.

In an embodiment, at step 302, the method 300 includes allowing the system 102 to extract the plurality of features from the plurality of signals acquired from the data sources 106-1 through 106-n. The plurality of signals include signals from multiple signal domain representations. For example the signals may be physiological signals from a subject being monitored such as electrocardiography (ECG, also known as EKG), and photo plethysmography (PPG) and so on. The signals can be acquired from data acquisition units (data sources 106-1 to 106-n) connected to a plurality of EEG or PPG sensors. These extracted features can then be processed as disclosed by method 300 to identify an appropriate feature subset-classifier pair for classifying the signals with classification labels in accordance to a predefined classification task, wherein the classification task classifies the subject into diseased or healthy class labels. In an example of industrial domain, the signals may be signals acquired from a plurality of sensors placed on a computer numerical control (CNC) machine to monitor health of the CNC machine. The features extracted from these signals may then be analyzed by the method 300 to classify the CNC into one of possible failure and in condition class labels At step 304, the method 300 includes allowing the system 102, comprising the joint selection module 212 to, derive the set of features from the extracted plurality of features based on the plurality of statistical measures corresponding to the extracted plurality of features. One or more statistical measures that may be used include mean, variance, skewness, kurtosis and the like.

At step 306, the method 300 includes allowing the system 102 to create the plurality of ranked lists by ranking the derived set of features. Each ranked list among the plurality of ranked lists is created based on the unique ranking objective selected from the plurality of ranking objectives. The plurality of ranked lists with corresponding derived set of features is represented as the feature matrix $\mathcal{T}r^{ranked}$). Instead of ranking based on single criteria such as maximizing mutual information among the features, which is used by existing ranking mechanisms, the method 300 allows the system 102 to separately ranks features based on multiple ranking objectives that provides unbiased estimation of importance of each feature.

Upon creation of the plurality of ranked list, at step 308, the method 300 includes allowing the system 102 to simultaneously determine the feature subset-classifier pair ($\mathcal{H}$ *, $\mathcal{T}r$ *) utilizing the metaheuristic incremental search based joint optimization technique applied on the plurality of ranked list and the plurality of classifiers types. The joint optimization technique jointly determines the feature subset from the ranked list among the plurality of ranked list and the classifier among the plurality of classifiers types ($\mathcal{H}$ ). which satisfy the performance objective function for the classification task to ensure best or highest performance over the performance objective (ρ). The performance criteria, for example can be maximizing sensitivity, maximizing F1-score and the like. The metaheuristic incremental search applied on the plurality of ranked list and the plurality of classifier types $\mathcal{H}$ , to determine the feature subset-classifier pair ($\mathcal{H}$ *, $\mathcal{T}r$ *) is a relax-greedy {feature subset, classifier} approach. The relax greedy approach utilizes a sub-greedy search process based on the patience function γ(δ), wherein a low performing feature is selected if the low performing feature in combination with other features demonstrates incremental performance gain within the patience window $\delta_{max}$ To implement the proposed metaheuristic incremental search based joint optimization technique, the method 300 allows the system 102 to identify the plurality of feature subsets for each classifier from the plurality of classifiers types. Each feature subset of the plurality of feature subsets is selected from every ranked list from the plurality of ranked lists by adding the derived feature from the ranked list one at a time. Further, each classifier is paired with the feature subset selected from the plurality of feature subsets to generate a plurality of feature subset-classifier pairs. The selected feature subset for pairing provides highest performance, wherein the performance is determined based on a set of performance parameters and a performance score computed using k-fold performance metric. Further, for all the plurality of feature subset-classifier pairs, the method 300 allows the system 102 to evaluate the plurality of feature subset-classifier pairs for the classification task. Based upon the evaluation, the method 300 allows the system 102 to determine the feature subset-classifier pair ($\mathcal{H}$ *, $\mathcal{T}r$ *) from the evaluated plurality of feature subset-classifier pairs, such that the determined the feature subset-classifier pair ($\mathcal{H}$ *, $\mathcal{T}r$ *) provides minimum structural risk and generalization error for the classification task by satisfying the performance objective (ρ) for the classification task with highest performance. The performance objective (ρ), for example, may be maximizing f1-score, maximizing accuracy and the like.

The illustrated steps of method 300 are set out to explain the exemplary embodiments shown, and it should be anticipated that ongoing technological development may change the manner in which particular functions are performed. These examples are presented herein for purposes of illustration, and not limitation.

Figure 4A:
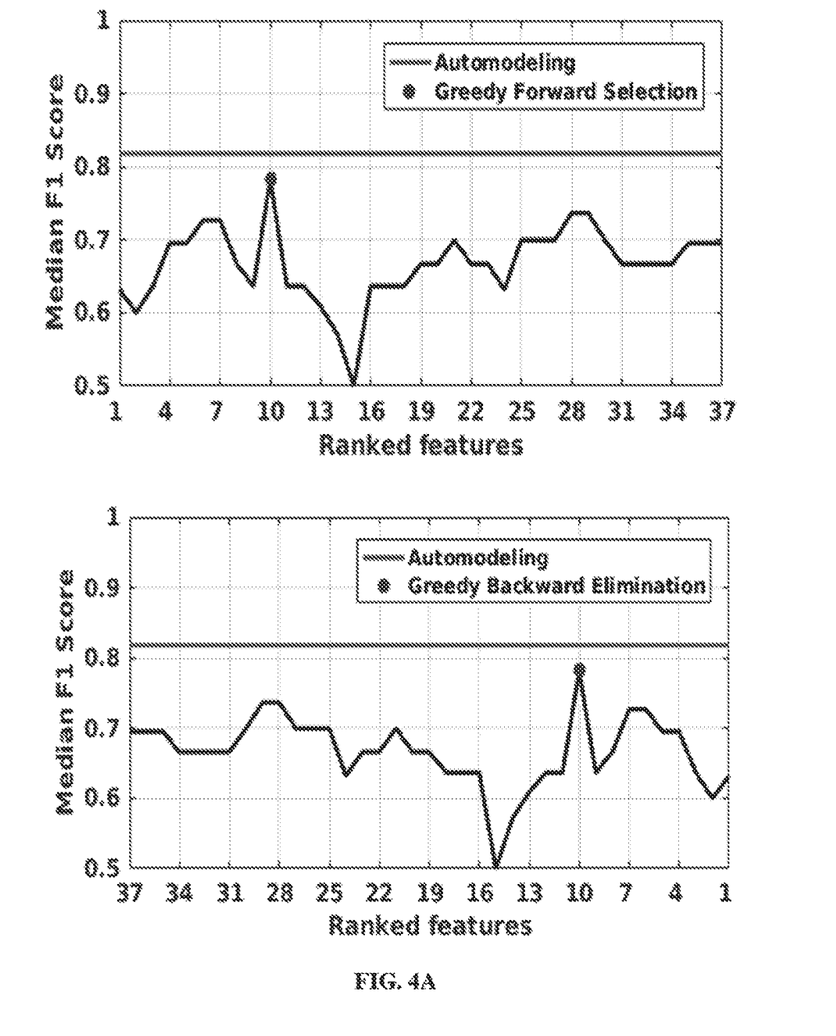
FIGS. 4A and 4B illustrate performance comparison of the method disclosed with different existing greedy wrapper methods, in accordance with some embodiments of the present disclosure.
Figure 4B:
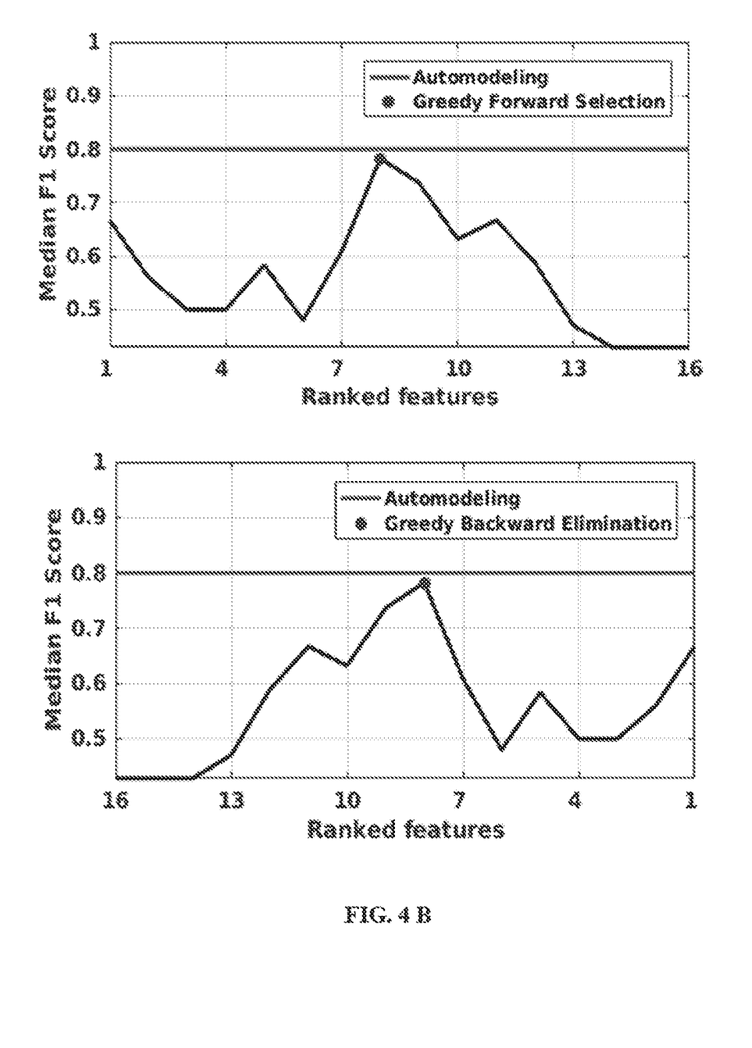

FIGS. 4A and 4B illustrates performance comparison of the method disclosed with different existing greedy wrapper methods, in accordance with some embodiments of the present disclosure.

Prior to the comparison of the method disclosed with existing methods, a use case example with practical applications is described. Physiological signals like the ECG, a Phonocardiogram (PCG) and the PPG are selected. These signals are heterogeneous in nature from multiple domains, with the ECG being an electrical signal, the PPG being an optical domain signal and the PCG being an audio signal. Each of the time-series corresponding to the signals is expert-annotated and binary classified. A Table 1 below depicts outcome of the automodel implemented by the joint selection module 212 for each of five datasets taken confirming stability of feature subset-classifier pair generation. The Table 1 shows results for two different objective functions (ρ): maximizing F1-score and maximizing classification accuracy. The classifier chosen and the fraction of total feature selected, $$\Delta = \frac{|\mathcal{T}r^*|}{\Psi}$$

are shown. It is observed that the generated model composition is similar (with small changes in the feature selection, classifier selection remains same) when performance objective function changes but dataset remains constant. Thus, the generated automodel framework is stable and fittingly learned from the training examples.

TABLE 1

| Data type | F1-score | Model | Accuracy | Model |
|---|---|---|---|---|
| ECG | 0.86 | SVM, Δ = 0.04 | 0.89 | SVM, Δ = 0.032 |
| PCG | 0.82 | SVM, Δ = 0.41 | 0.80 | SVM, Δ = 0.14 |
| PCG | 0.80 | Adaboost, Δ = 0.91 | 0.92 | Adaboost, Δ = 0.98 |
| PPG | 0.81 | Random forest, Δ = 0.63 | 0.76 | Random forest, Δ = 0.55 |
| PPG | 0.80 | SVM, Δ = 0.31 | 0.81 | SVM, Δ = 0.50 |

Where, Δ is the fraction of features selected (recommended) from the complete feature set. Further, table 2 below provides a comparative study of the performance of automodel (system 102 comprising the joint selection model (212) with state-of-the-art methods as well as with manual effort of classification for different performance objective like F1-score and accuracy. In manual method, a team of machine learning experts along with domain experts attempted to learn model for each of the physiological signals with a couple of months effort mostly through trial and error runs with hand-crafted design. Also, considered is relevant deep learning based algorithm. In table 2, the capability of automodel is demonstrated to depict that automodel outperforms both manual effort based learning and state-of-the-art solutions for each of the datasets in both performance objectives.

TABLE 2

| Data type | Algorithm | F1-score | Accuracy |
|---|---|---|---|
| ECG | Automodel | 0.86 | 0.89 |
| | D. Ververidis and C. Kotropoulos, "Fast and accurate feature subset selection applied into speech emotion recognition," | 0.78 | 0.84 |
| | N. Xuan, V, Jeffrey, C, S. Romano, and J. Bailey, "Effective global approaches for mutual information based feature selection," | 0.83 | 0.87 |
| | Manual effort | 0.84 | 0.86 |
| | Deep Learning | 0.74 | 0.60 |
| PCG | Automodel | 0.82 | 0.80 |
| | D. Ververidis and C. Kotropoulos, "Fast and accurate feature subset selection applied into speech emotion recognition," | 0.71 | 0.70 |
| | N. Xuan, V, Jeffrey, C, S. Romano, and J. Bailey, "Effective global approaches for mutual information based feature selection," | 0.67 | 0.60 |
| | Manual effort | 0.78 | 0.75 |
| | Deep Learning | 0.71 | 0.55 |
| PCG | Automodel | 0.80 | 0.92 |
| | D. Ververidis and C. Kotropoulos, "Fast and accurate feature subset selection applied into speech emotion recognition," | 0.56 | 0.72 |

TABLE 2-continued

| Data type | Algorithm | F1-score | Accuracy |
|---|---|---|---|
| | N. Xuan, V, Jeffrey, C, S. Romano, and J. Bailey, "Effective global approaches for mutual information based feature selection," | 0.78 | 0.91 |
| | Manual effort | 0.54 | 0.77 |
| | Deep Learning | 0.92 | 0.86 |
| PPG | Automodel | 0.81 | 0.76 |
| | D. Ververidis and C. Kotropoulos, "Fast and accurate feature subset selection applied into speech emotion recognition," | 0.58 | 0.55 |
| | N. Xuan, V, Jeffrey, C, S. Romano, and J. Bailey, "Effective global approaches for mutual information based feature selection," | 0.79 | 0.72 |
| | Manual effort | 0.72 | 0.66 |
| | Deep Learning | 0.81 | 0.72 |
| PPG | Automodel | 0.80 | 0.81 |
| | D. Ververidis and C. Kotropoulos, "Fast and accurate feature subset selection applied into speech emotion recognition," | 0.55 | 0.58 |
| | N. Xuan, V, Jeffrey, C, S. Romano, and J. Bailey, "Effective global approaches for mutual information based feature selection," | 0.70 | 0.73 |
| | Manual effort | 0.78 | 0.81 |
| | Deep Learning | 0.53 | 0.46 |

Further, as depicted in FIGS. 4A and 4B, the existing greedy approach of wrapper functions underperforms against the automodel, where relax-greedy approach of the automodel frame-work tries to converge to the optimal solution of the performance criteria. The automodel performance comparison with different greedy wrapper methods for PCG database is shown in the FIG. 4A and for PPG database is shown in the FIG. 4B.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for selection of a feature subset-classifier pair for a classification task, the method comprising:
   extracting a plurality of features from a plurality of signals, wherein the plurality of signals comprise signals from multiple signal domain representations;
   deriving a set of features from the extracted plurality of features based on a plurality of statistical measures corresponding to the extracted plurality of features;
   creating a plurality of ranked lists by ranking the derived set of features, wherein each ranked list among the plurality of ranked lists is created based on a unique ranking objective selected from a plurality of ranking objectives that provides unbiased estimation of importance of each feature, wherein the plurality of ranked lists with corresponding derived set of features in each ranked list is represented as a feature matrix ($\mathcal{Tr}^{ranked}$); and
   simultaneously determining the feature subset-classifier pair ($\mathcal{H}^*$, $\mathcal{Tr}^*$), comprising a feature subset ($\mathcal{Tr}^*$) selected from a ranked list among the plurality of ranked lists and a classifier ($\mathcal{H}^*$) among a plurality of classifiers types ($\mathcal{H}$), utilizing a metaheuristic incremental search applied on the plurality of ranked lists and the plurality of classifiers types ($\mathcal{H}$), wherein the determined feature subset-classifier pair ($\mathcal{H}^*$, $\mathcal{Tr}^*$) provides highest performance over a performance objective ($\rho$) for the classification task, and wherein simultaneously determining the feature subset-classifier pair ($\mathcal{H}^*$, $\mathcal{Tr}^*$) utilizing the metaheuristic incremental search based joint optimization technique comprises:
   identifying a plurality of feature subsets for each classifier among the plurality of classifiers types, wherein each feature subset among the plurality of feature subsets is selected from each ranked list by adding a feature among the plurality of derived set of features of each ranked list one at a time;
   pairing each classifier with a feature subset selected from the plurality of feature subsets to generate a plurality of feature subset-classifier pairs, wherein the selected feature subset provides highest performance over a set of performance parameters and a performance score;
   evaluating the generated plurality of feature subset-classifier pairs for the classification task; and
   determining the feature subset-classifier pair ($\mathcal{H}^*$, $\mathcal{Tr}^*$) from the evaluated plurality of feature subset-classifier pairs that provides minimum structural risk and generalization error for the classification task by satisfying the performance objective function.

2. The method of claim 1, wherein the metaheuristic incremental search applied on the plurality of ranked list and the plurality of classifiers types $\mathcal{H}$, to determine the feature subset-classifier pair ($\mathcal{H}^*$, $\mathcal{Tr}^*$) is a relax-greedy {feature subset, classifier} approach utilizing sub-greedy search process based on a patience function $\gamma(\delta)$, wherein $\delta$ is a patience score, and wherein the patience function $\gamma(\delta)$ ensures a low performing feature is selected if the low performing feature in combination with other features demonstrates incremental performance gain within a patience window $\delta_{max}$.

3. A system for selection of a feature subset-classifier pair for a classification task, the system comprising:
   a processor;
   an Input/Output (I/O) interface;
   a memory, wherein the memory comprises a joint selection module;
   the joint selection module is configured to:
   extract a plurality of features from a plurality signals, wherein the plurality of signals comprise signals from multiple signal domain representations;
   derive a set of features from the extracted plurality of features based on a plurality of statistical measures corresponding to the extracted plurality of features;
   create a plurality of ranked lists by ranking the derived set of features, wherein each ranked list among the plurality of ranked lists is created based on a unique ranking objective selected from a plurality of ranking objectives that provides unbiased estimation of importance of each feature, wherein the plurality of ranked lists with corresponding derived set of features in each ranked list is represented as a feature matrix ($\mathcal{T}r^{ranked}$); and simultaneously determine the feature subset-classifier pair ($\mathcal{H}$ *, $\mathcal{T}r$ *) comprising a feature subset ($\mathcal{T}r$ *) selected from a ranked list among the plurality of ranked lists and a classifier ($\mathcal{H}$ *) among a plurality of classifiers types ($\mathcal{H}$), utilizing a metaheuristic incremental search applied on the plurality of ranked list and the plurality of classifiers types ($\mathcal{H}$), wherein the determined feature subset-classifier pair ($\mathcal{H}$ *, $\mathcal{T}r$ *) provides highest performance over a performance objective function ($\rho$) for the classification task, and wherein simultaneously determining the feature subset-classifier pair ($\mathcal{H}$ *, $\mathcal{T}r$ *) utilizing the metaheuristic incremental search based joint optimization by:

identifying a plurality of feature subsets for each classifier among the plurality of classifiers types, wherein each feature subset among the plurality of the feature subsets is selected from each ranked list by adding a feature among the plurality of derived set of features of each ranked list one at a time;

pairing each classifier with a feature subset selected from the plurality of feature subsets to generate a plurality of feature subset-classifier pairs, wherein the selected feature subset provides highest performance over a set of performance parameters and a performance score;

evaluating the generated plurality of feature subset-classifier pairs for the classification task; and determining the feature subset-classifier pair ($\mathcal{H}$ *, $\mathcal{T}r$ *) from the evaluated plurality of feature subset-classifier pairs that provides minimum structural risk and generalization error for the classification task by satisfying the performance objective function.

4. The system of claim 3, wherein the metaheuristic incremental search applied on the plurality of ranked list and the plurality of classifiers types $\mathcal{H}$ to determine the feature subset-classifier pair is a relax-greedy {feature subset, classifier} approach utilizing sub-greedy search process based on a patience function $\gamma(\delta)$, wherein $\delta$ is a patience score, and wherein the patience function $\gamma(\delta)$ ensures a low performing feature is selected if the low performing feature in combination with other features demonstrates incremental performance gain within a patience window $\delta_{max}$.

5. A non-transitory computer readable medium, the non-transitory computer-readable medium stores instructions which, when executed by a hardware processor, cause the hardware processor to perform actions comprising:

extracting a plurality of features from a plurality of signals, wherein the plurality of signals comprise signals from multiple signal domain representations;

deriving a set of features from the extracted plurality of features based on a plurality of statistical measures corresponding to the extracted plurality of features;

creating a plurality of ranked lists by ranking the derived set of features, wherein each ranked list among the plurality of ranked lists is created based on a unique ranking objective selected from a plurality of ranking objectives that provides unbiased estimation of importance of each feature, wherein the plurality of ranked lists with corresponding derived set of features in each ranked list is represented as a feature matrix ($\mathcal{T}r^{ranked}$); and simultaneously determining the feature subset-classifier pair ($\mathcal{H}$ *, $\mathcal{T}r$ *), comprising a feature subset ($\mathcal{T}r$ *) selected from a ranked list among the plurality of ranked lists and a classifier ($\mathcal{H}$ *) among a plurality of classifiers types ($\mathcal{H}$), utilizing a metaheuristic incremental search applied on the plurality of ranked lists and the plurality of classifiers types ($\mathcal{H}$), wherein the determined feature subset-classifier pair ($\mathcal{H}$ *, $\mathcal{T}r$ *) provides highest performance over a performance objective ($\rho$) for the classification task, and wherein simultaneously determining the feature subset-classifier pair ($\mathcal{H}$ *, $\mathcal{T}r$ *) utilizing the metaheuristic incremental search based joint optimization technique comprises:

identifying a plurality of feature subsets for each classifier among the plurality of classifiers types, wherein each feature subset among the plurality of feature subsets is selected from each ranked list by adding a feature among the plurality of derived set of features of each ranked list one at a time;

pairing each classifier with a feature subset selected from the plurality of feature subsets to generate a plurality of feature subset-classifier pairs, wherein the selected feature subset provides highest performance over a set of performance parameters and a performance score;

evaluating the generated plurality of feature subset-classifier pairs for the classification task; and determining the feature subset-classifier pair ($\mathcal{H}$ *, $\mathcal{T}r$ *) from the evaluated plurality of feature subset-classifier pairs that provides minimum structural risk and generalization function.

6. The non-transitory computer readable medium of claim 5, wherein the metaheuristic incremental search applied on the plurality of ranked list and the plurality of classifiers types $\mathcal{H}$, to determine the feature subset-classifier pair ($\mathcal{H}$ *, $\mathcal{T}r$ *) is a relax-greedy {feature subset, classifier} approach utilizing sub-greedy search process based on a patience function $\gamma(\delta)$, wherein $\delta$ is a patience score, and wherein the patience function $\gamma(\delta)$ ensures a low performing feature is selected if the low performing feature in combination with other features demonstrates incremental performance gain within a patience window $\delta_{max}$.

* * * * *